A. G. STAPEL.
ACCELERATOR FOR HOT WATER HEATING SYSTEMS.
APPLICATION FILED MAR. 3, 1911.
1,029,032.
Patented June 11, 1912.
2 SHEETS—SHEET 1.
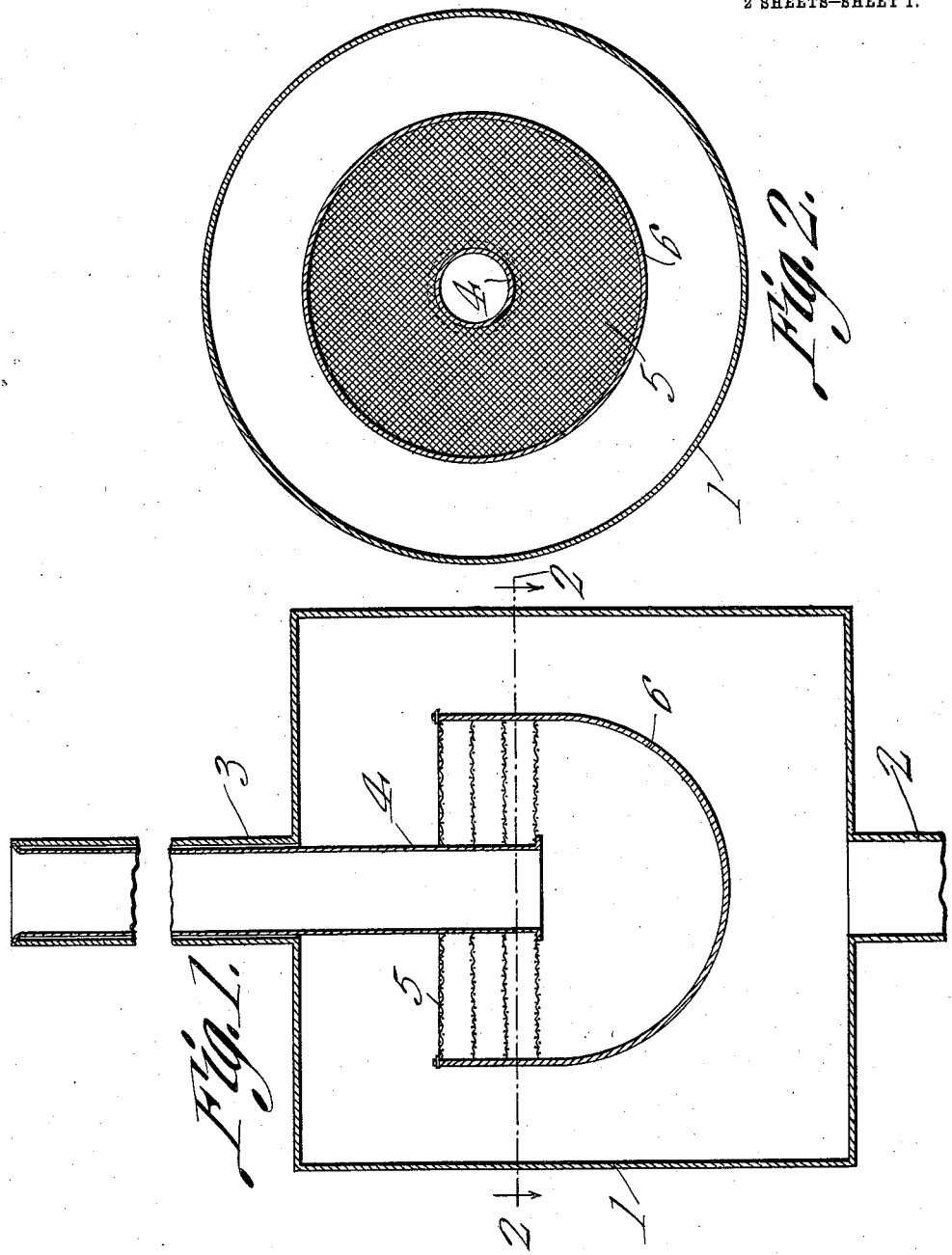
Witnesses
Adolf G. Stapel, Inventor
by C. A. Snow & Co., Attorneys

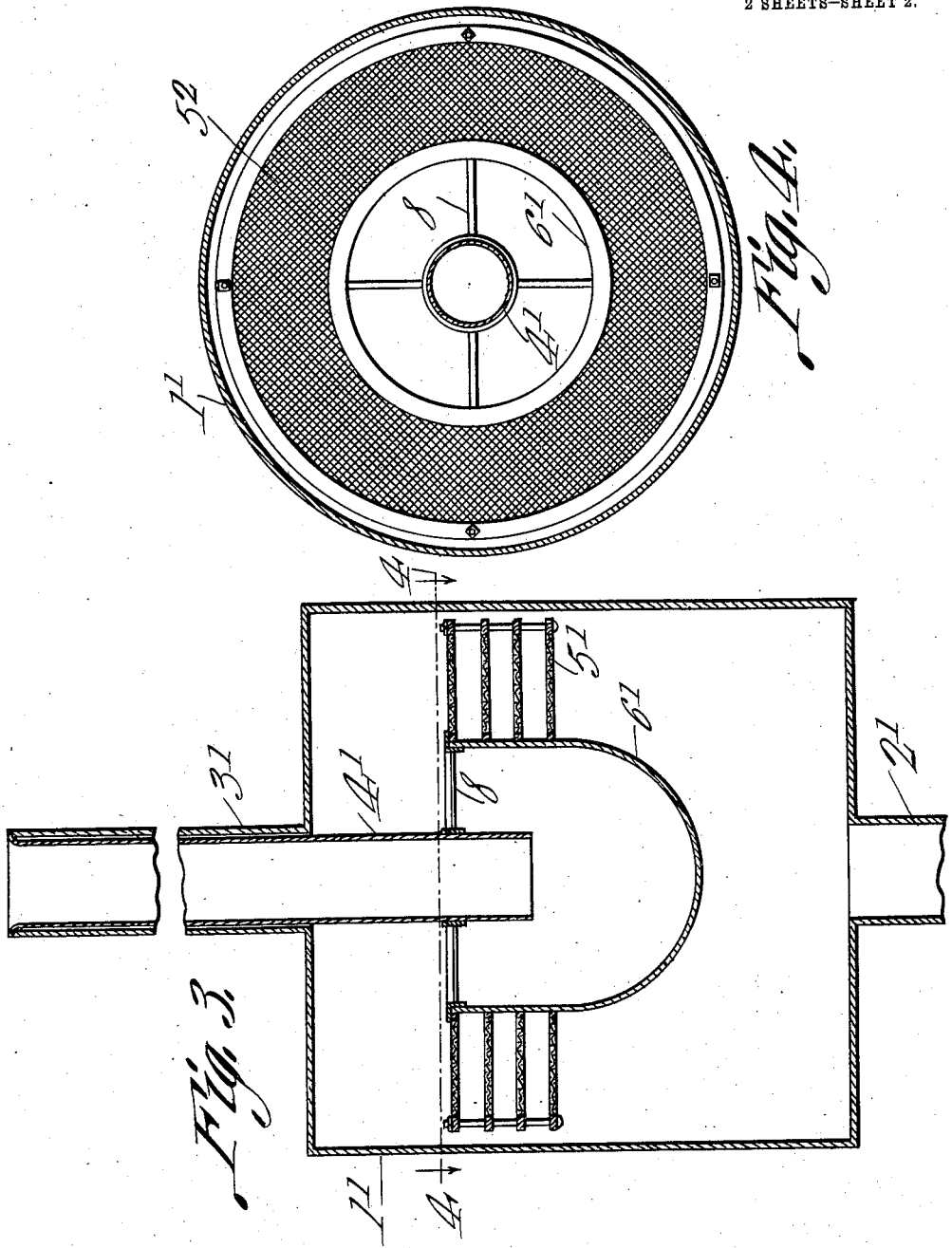

UNITED STATES PATENT OFFICE.

ADOLF G. STAPEL, OF MONTGOMERY, ALABAMA.

ACCELERATOR FOR HOT-WATER HEATING SYSTEMS.

1,029,032. Specification of Letters Patent. Patented June 11, 1912.

Application filed March 3, 1911. Serial No. 612,043.

*To all whom it may concern:*

Be it known that I, ADOLF G. STAPEL, a citizen of the United States, residing at Montgomery, in the county of Montgomery and State of Alabama, have invented a new and useful Accelerator for Hot-Water Heating Systems, of which the following is a specification.

This invention relates to an accelerator for hot water heating systems of the general type illustrated and described in United States Letters Patent No. 980360, granted to me January 3, 1911.

The object of the present invention is to provide a strong, simple, durable, and inexpensive form of accelerator.

With the foregoing and other objects in view, which will appear as the description proceeds, the invention resides in the combination and arrangement of parts and in the details of construction, hereinafter described and claimed, it being understood that changes in the embodiment of invention herein disclosed can be made within the scope of what is claimed without departing from the spirit of the invention.

In the accompanying drawings forming a part of this specification: Figure 1 is a vertical section through one form of the accelerator of the present invention; Fig. 2 is a horizontal section on the line 2—2 of Fig. 1; Fig. 3 is a view similar to Fig. 1, showing a slightly modified construction; and Fig. 4 is a horizontal section on the line 4—4 of Fig. 3.

Like reference numerals indicate corresponding parts in the different figures of the drawings.

The accelerator of the present invention preferably includes a tank 1 which is connected by means such as the pipe 2 with the boiler or furnace.

The numeral 3 represents the ascending pipe leading to the expansion tank and connecting with the circulating system as a whole. Mounted in the pipe or conductor 3 is a pipe or conductor 4 which projects at its lower end below the pipe 3 and into the tank 1. Connected with the lower end of the pipe 4 are a plurality of horizontally disposed outwardly extending partitions 5 which are formed of any suitable foraminous material, such for example as copper wire mesh, or cloth. The conductor 4 at its lower end projects into a baffle member 6 which preferably, although not essentially, is substantially cup shaped as shown, and serves to baffle or deflect the water rising in a superheated condition through the conductor 2 from passing directly into the conductor 4.

The operation of the device illustrated in Fig. 1 is substantially as follows: The water rising through the conductor 2, when the device is in full operation, is heated above 212 degrees. This water passes around the baffle 6 and is then required to pass downward through the foraminous partitions 5 where steam is rapidly generated. This steam passes down into the cup shaped baffle 6 and then upward through the conductor 4 where its movement serves to impart rapid movement to the rising column of water in the hot water heating system. The rapid rising of the steam through the conductor 4 serves to lower the pressure in the baffle 6 and tank 1 and this lowering of the pressure facilitates the formation of the steam by removing the pressure from the ascending column of water delivered into the tank 1 from the pipe 2.

In the modified construction illustrated in Figs. 3 and 4 the baffle 6' has the same relative arrangement to the bottom of the pipe 4' and is supported thereon by means of the outwardly extending spider arms 8. The horizontally disposed outwardly extending foraminous partitions 5' are supported on the outside of the baffle 6'.

The operation of the modified form is as follows: The superheated water rising through the pipe or conductor 2' passes around the baffle 6' and upward through the screens or partitions 5' where the steam is generated. This steam passes downward into the baffle 6' and upward into the pipe 4', thus accelerating the circulation in the system and relieving the pressure in the tank 1', so as further to facilitate the formation of the steam.

What is claimed is:

1. An accelerator comprising a tank having an inlet in its lower portion, an outlet conduit communicating with said tank below its top and arranged in substantial alinement with said inlet, and a concave baffle interposed between said inlet and said outlet, and having its upper edge above the lower end of said outlet conduit.

2. An accelerator comprising a tank having an inlet in its lower portion, an outlet conduit communicating with said tank below its top and arranged in substantial alinement with said inlet, a concave baffle interposed between said inlet and said outlet and having its upper edge above the lower end of said outlet conduit, and screening means arranged in said tank adjacent the upper edge of said baffle.

3. An accelerator comprising a tank having an inlet in its lower portion, an outlet conduit communicating with said tank below its top, and a substantially cup-shaped baffle interposed between said inlet and said outlet conduit, with its cavity opening upward, said outlet conduit projecting at its lower end into said cavity.

In testimony that I claim the foregoing as my own, I have hereto affixed my signature in the presence of two witnesses.

ADOLF G. STAPEL.

Witnesses:
 FREDRICK ANSFELD,
 ROBERT HUGGER.

Copies of this patent may be obtained for five cents each, by addressing the "Commissioner of Patents, Washington, D. C."